United States Patent [19]

Delacourt et al.

[11] Patent Number: 4,943,144
[45] Date of Patent: Jul. 24, 1990

[54] ELECTROMAGNETIC WAVE MODULATOR WITH QUANTUM WELL STRUCTURE AND ITS USE AS A POLARIZER

[75] Inventors: Dominique Delacourt, Paris; Michel Papuchon, Massy; Jean Paul Pocholle, Arpajon, all of France

[73] Assignee: Thomson-CSF, Paris, France

[21] Appl. No.: 238,250

[22] Filed: Aug. 30, 1988

[30] Foreign Application Priority Data

Sep. 1, 1987 [FR] France ............................ 87 12153

[51] Int. Cl.$^5$ .............................................. G02F 1/01
[52] U.S. Cl. ..................................... 350/354; 350/370
[58] Field of Search ............... 350/354, 353, 355, 374, 350/370, 373; 372/2, 22

[56] References Cited

U.S. PATENT DOCUMENTS

| | | | |
|---|---|---|---|
| 3,809,953 | 5/1974 | Nishizawa | 317/235 N |
| 4,525,687 | 6/1985 | Chemla et al. | 350/355 |
| 4,716,449 | 12/1987 | Miller | 350/354 X |
| 4,818,079 | 4/1989 | Maserjian | 350/354 |

FOREIGN PATENT DOCUMENTS 8402782  7/1984  PCT Int'l Appl. ................. 350/354
8403363  8/1984  World Int. Prop. O. .

Primary Examiner—Eugene R. Laroche
Assistant Examiner—Nathan W. McCutcheon
Attorney, Agent, or Firm—Oblon, Spivak, McClelland, Maier & Neustadt

[57] ABSTRACT

A modulator enables the modulation of a wave in the medium infrared range by means of a signal modulating the amplitude of another electromagnetic wave in the near infrared range. The modulator comprises: a central layer such that the electrons of the conduction band have at least two permitted discrete levels of energy, the energy difference of which corresponds to a frequency close to the frequency of the wave to be modulated, and such that the holes of the valence band have permitted levels of energy such that the difference in energy between the permitted fundamental level for the holes in the valence band and the permitted fundamental level for the electrons in the conduction band has a value close to that corresponding to the frequency of the control wave.

5 Claims, 4 Drawing Sheets

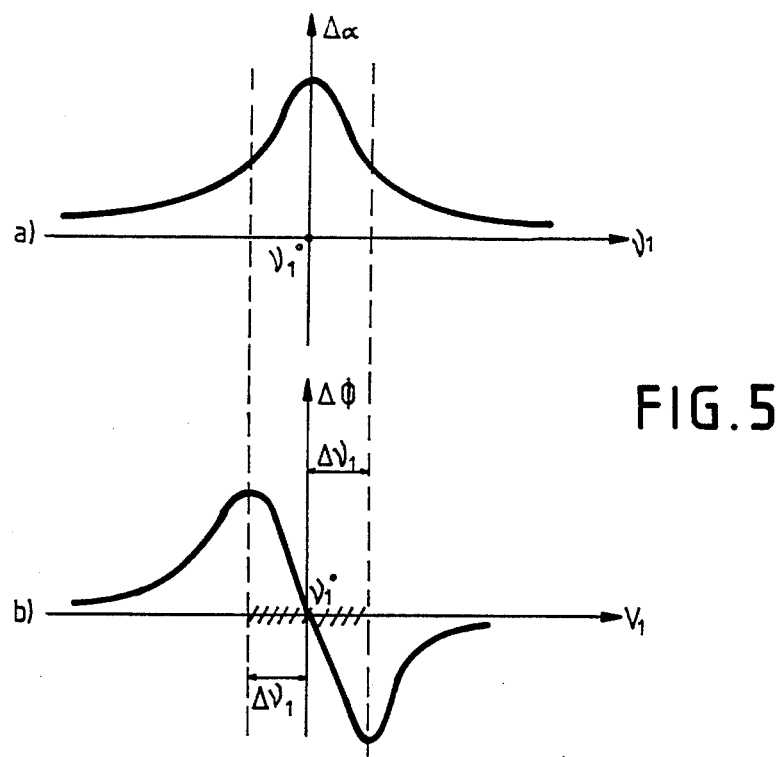
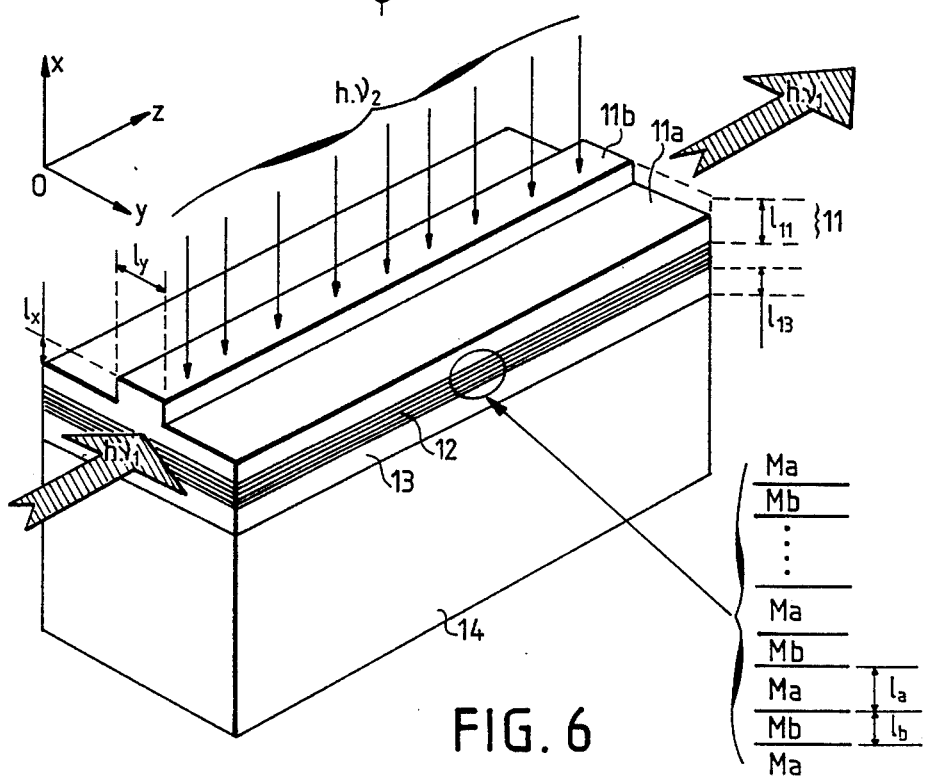
FIG. 5
FIG. 6

ELECTROMAGNETIC WAVE MODULATOR WITH QUANTUM WELL STRUCTURE AND ITS USE AS A POLARIZER

BACKGROUND OF THE INVENTION

1. Field of the Invention

The invention concerns a modulator for the amplitude or phase modulation of an electromagnetic wave, especially in the range extending from visible to far infrared waves. The wave to be modulated may be a guided wave or a free wave.

2. Description of the Prior Art

There are known methods for making modulators working in the medium infrared range and using an injection of carriers. This type of modulator has a limited pass-band because of the long lifetime of the carriers. There are also known methods for making modulators with electro-optical effect. This is a very fast effect, but a pass-band corresponding to the quickness of this effect cannot be obtained because these modulators have electrodes designed to apply an electric field, and these electrodes have relatively high capacitance values.

In standard modulators, the pass-band depends on the dimensions of the modulator. This problem of pass-bands is aggravated when the wavelength increases because the dimensions of a modulator increase with the wavelength of the wave to be modulated. In particular, it is far more difficult to make a modulator for waves in the medium infrared range than to make one for waves in the visible or near infrared range.

The aim of the invention is to propose a modulator with a wider pass-band than that of standard modulators for waves in the medium or far infrared range.

SUMMARY OF THE INVENTION

The object of the invention is a modulator that brings into play an optical-optical interaction, in semiconducting materials, between a first wave, known as a wave to be modulated, and a second wave, generally of a higher frequency, called a control wave, carrying the modulating signal, in the form of an amplitude modulation. This interaction is made possible by the use of quantum structures with at least two discrete levels. The wave to be modulated may belong, for example, to the medium infrared range while the control wave may belong to the visible or near infrared range in which it is easy to make standard modulators.

The modulator according to the invention can also be used as a controllable polarizer.

According to the invention, there is proposed a modulator for electromagnetic waves to modulate a wave with a frequency $\nu_1$, called a wave to be modulated, by a signal modulating the amplitude of a second wave with a frequency $\nu_2$, called a control wave, said modulator comprising at least one first layer of semiconducting material of a first type, included between two layers of a semiconducting material of a second type, all the layers being crossed by the wave to be modulated and by the control wave; the two types of materials being such that there is a potential well in the conduction band and in the valence band of each first layer; the thickness of each first layer being such that the electrons of its conduction band possess at least two permitted, discrete energy levels, the energy difference between these two levels corresponding to a frequency close to the frequency $\nu_1$ of the wave to be modulated; the thickness of each first layer further being such that the holes of its valence band possess permitted energy levels such that the energy difference between the permitted fundamental level for the holes in the valence band and the permitted fundamental level for the electrons in the conduction band has a value close to that corresponding to the frequency $\nu_2$ of the control wave.

BRIEF DESCRIPTION OF THE DRAWINGS

FIG. 5 shows graphs of the absorption and phase shift of the wave to be modulated, as a function of its frequency;

FIG. 6 shows a second exemplary embodiment of the modulator according to the invention, to modulate a wave guided along two dimensions;

DETAILED DESCRIPTION OF PREFERRED EMBODIMENTS

Figure 1:
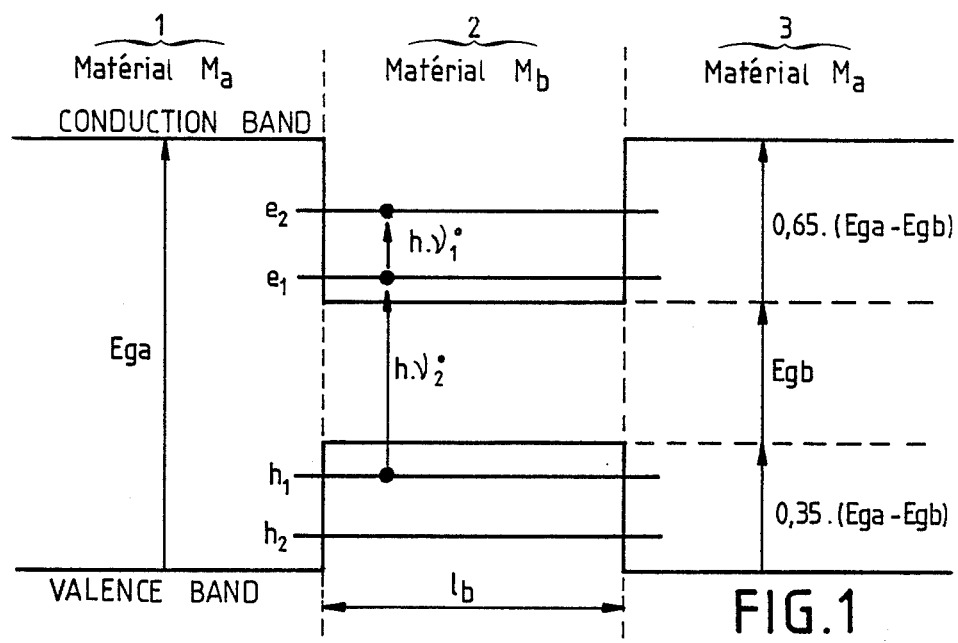
FIG. 1 is a diagram of the energy levels in the quantum structure used in the modulator according to the invention.

The diagram of FIG. 1 shows the energy levels of the carriers in a quantum structure used in the modulator according to the invention. This quantum structure has a layer 2 of semiconducting material of a first type, marked $M_b$, and two layers 1 and 3 of a semiconducting material of a second type, marked $M_a$, located on either side of the layer 2. The layers 1 and 3 have a bandgap with a width $E_{ga}$ while the layer 2 has a bandgap with a width $E_{gb}$ smaller than $E_{ga}$.

It is generally assumed that the difference between these two widths is distributed between the conduction band and the valence band in proportions close to 65% and 35% respectively.

The association of these three layers of semiconducting material having different bandgap widths enables the creation of a potential well for the electrons in the conduction and for the holes in the valence band. When the dimensions of these holes are close to the de Broglie wavelengths associated with these particles, the total energy permitted to them can have only a finite number of discrete values. This number of values and these values directly depend on the dimensions of the quantum wells and on the characteristics of the semiconducting materials.

The quantum structure used in the modulator according to the invention has only one dimension, namely the thickness $1_b$ of the layer 2. The well thus possesses two permitted discrete levels of energy, $e_1$ and $e_2$, for the electrons in the conduction band, and two levels, $h_1$ and $h_2$, for the holes in the conduction band. To simplify the description, the holes of the valence band are all assumed to have the same characteristics. This means that there exist only two permitted discrete levels of energy, $h_1$ and $h_2$.

The semiconducting material that forms the layer 2 has no doping. It has only a residual doping, which is as small as current technology permits, so that the fundamental level $e_1$ of the conduction band in the quantum well is deserted in order to obtain maximum modulating efficiency. The layers 1 and 2, for their part, consist of a non-doped semiconducting material. If all three layers were to have doping, the modulating efficiency would be diminished but there would still be a modulation effect.

In the working of the modulator according to the invention, the level $e_1$ is populated by means of an optical pumping operation through a control wave with a frequency $\nu_2$, close to a frequency $\nu_2^0$, corresponding to the energy difference between the fundamental level $h_1$ in the valence band and the fundamental level $e_1$ in the conduction band, in the quantum well. The populating of the level $e_1$ thereupon enables a resonant transition from the level $e_1$ to the level $e_2$, and thus notably modifies the optical characteristics of the materials forming the quantum well.

A wave with a frequency $\nu_1$, close to a frequency $\nu_1^0$ corresponding to the energy difference between the levels $e_1$ and $e_2$, undergoes an absorption and a phase shift which depend on the populating of the level $e_1$. Since this populating depends on the amplitude of the pumping wave, the frequency $\nu_1$ can be modulated in amplitude and phase by acting on the amplitude of the control wave that provides for the optical pumping.

Without optical pumping, this quantum structure is quite transparent to the wave to be modulated, for the energy of these photons, $h \cdot \nu_1$, where h is Planck's constant, is smaller than the widths $E_{ga}$ and $E_{gb}$ of the bandgaps of the materials $M_a$ and $M_b$.

For reasons of symmetry, the transition from the level $h_2$ to the level $e_1$ cannot occur. The transition from the level $h_2$ to the level $e_2$ is not to be sought.

Figure 2:
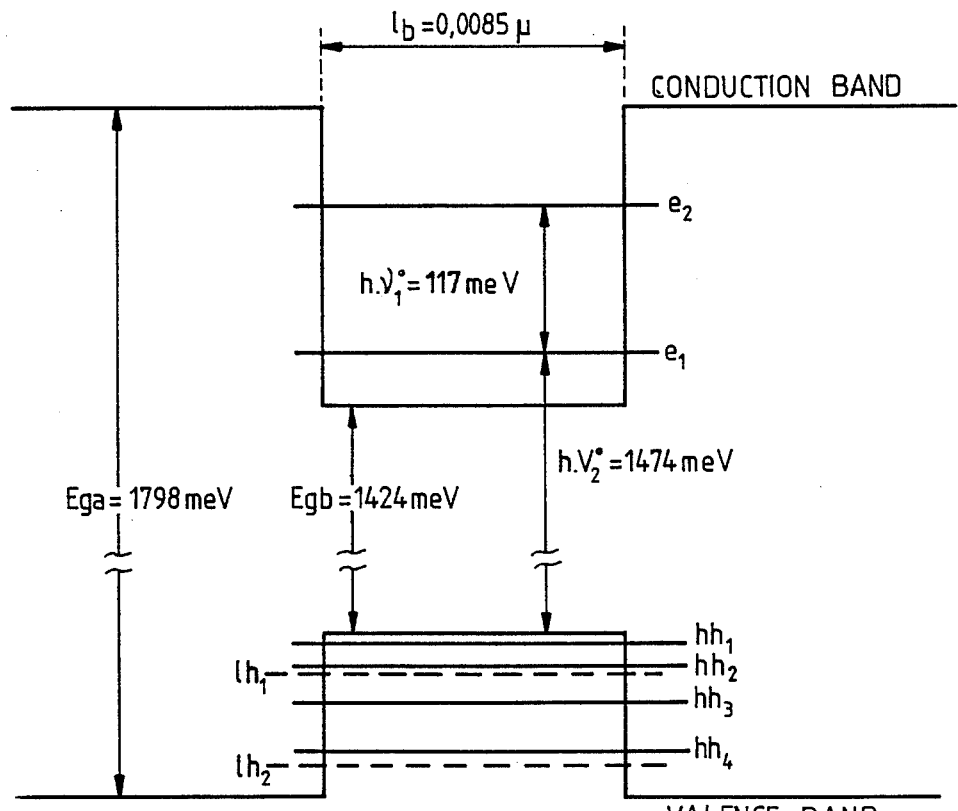
FIG. 2 is a diagram of the energy levels in this quantum structure for an example of a choice of materials constituting the modulator according to the invention.

FIG. 2 shows a diagram of the energy levels similar to that of FIG. 1 for an embodiment wherein the layers 1 and 3 consist of $Ga_{0.7} Al_{0.3} As$ and where the layer 1 consists of GaAs. For these materials, $E_{ga}$ is equal to 1798 meV and $E_{gb}$ is equal to 1424 meV. For a thickness $l_b = 0.0085$ microns, the permitted energy levels are such that the transition from the level $e_1$ to the level $e_2$ corresponds to a difference in energy of 117 meV and to a wavelength of 10.6 microns. The wave to be modulated should therefore have a wavelength close to this value.

The heavy holes have four permitted energy levels: $hh_1, \ldots, hh_4$. The light holes have two permitted energy levels $lh_1$ and $lh_2$. The energy difference between the permitted fundamental level for the heavy holes $hh_1$ and the permitted fundamental level for the electrons $e_1$, in the conduction band, is equal to 1474 meV, which corresponds to a wavelength of 0.84 micron. The wavelength of the control wave should therefore be close to this value in order to do the optical pumping, and should therefore be easily obtained with a semiconductor laser. This example shows that it is possible to achieve interaction, within this quantum structure, between a wave in the very near infrared range and a wave in the medium infrared range. The latter could be provided, for example, by a $CO_2$ gas laser.

Figure 3:
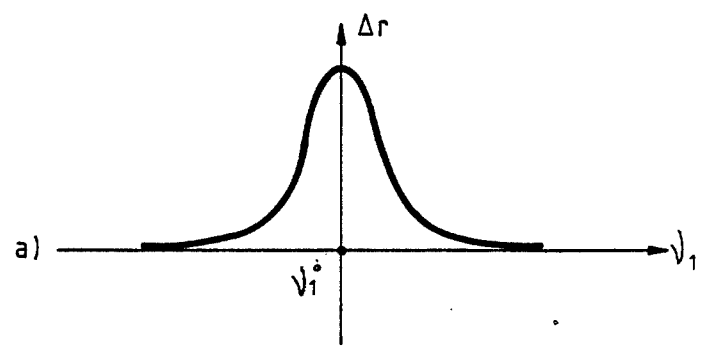
FIG. 3 shows graphs of the real part and the imaginary part of the refraction index in the quantum structure, as a function of the frequency of the wave to be modulated.
Figure 3:
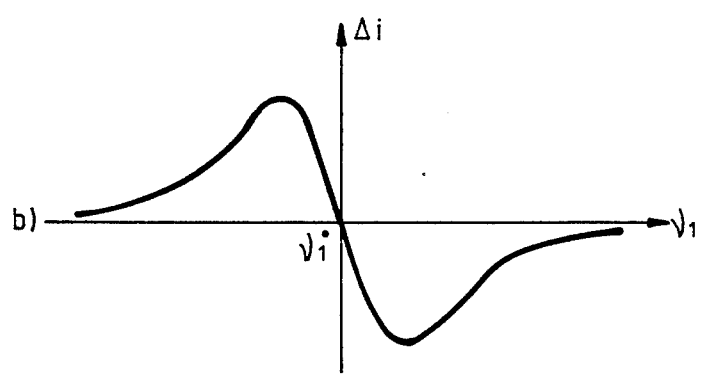

FIGS. 3a and 3b respectively show the graph of the real part $\Delta r$ and the imaginary part $\Delta i$ of the refraction index in the quantum structure in the neighbourhood of the frequency $\nu_1^0$ corresponding exactly to the resonant transition from the level $e_1$ to the level $e_2$. The graph of the real part is shaped like a bell centered on the frequency $\nu_1^0$ while the graph of the imaginary part is shaped like an S centered on the frequency $\nu_1^0$, with a minimum and a minimum on either side of this frequency. These curves of abnormal variation reveal the possibilities for the phase or amplitude modulation of a wave with a frequency $\nu_1$ close to the frequency $\nu_1^0$.

Figure 4:
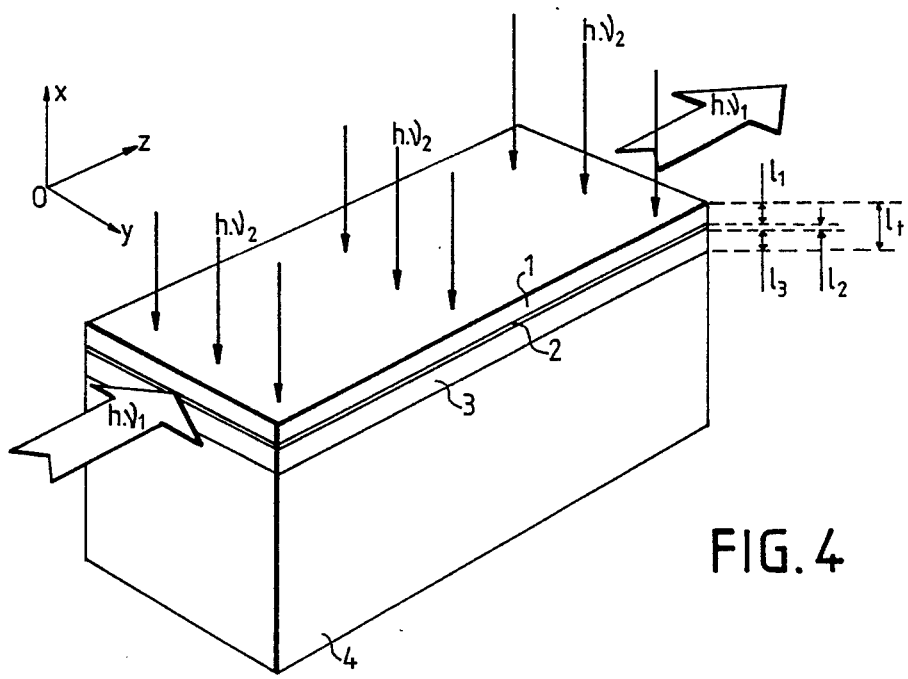
FIG. 4 shows a first exemplary embodiment of a modulator according to the invention, to modulate a wave guided along a single dimension.

FIG. 4 gives a schematic view of a first embodiment of the modulator according to the invention, to modulate a waveguide by confinement along a single dimension. It has three layers 1, 2, 3 of semiconducting materials, $M_a$, $M_b$, $M_a$ respectively, deposited successively by epitaxial growth on a substrate 4 which itself consists of semiconducting material. The three layers 1 to 3 and the substrate 4 have the same crystalline structure and their lattice parameters are all identical or very close to one another. These three layers correspond to the three layers of the diagram shown in FIG. 1. The thickness of the layer 2 is such that a quantum well with two permitted levels, $e_1$ and $e_2$, is made in the conduction band.

The wave to be modulated, marked $h \cdot \nu_1$, is applied to the layers 1, 2, 3, parallel to their plane, and comes out parallel to their plane after having crossed them longitudinally. The set of layers 1 to 3 constitutes the light-guiding zone. Its thickness $l_t$ as well as the value of the indices of the materials are chosen in such a way that these three layers provide for the guiding of at least one propagation mode for frequencies close to $\nu_1^0$. The thicknesses $l_1$ and $l_3$ of the layers 1 and 3 respectively are chosen so as to optimize the overlapping of the propagation mode or modes which it is desired to modulate with disturbance localized in the region of the quantum well.

The control wave, marked $h \cdot \nu_2$, crosses the layers 1, 2, 3, perpendicularly to the plane of these layers in this example. It may have any angle of incidence. The control wave is given, for example, by a standard modulator (not shown). The making of this standard modulator, for the frequency $\nu_2$, is within the scope of those skilled in the art. This standard modulator receives, firstly, a wave with a frequency $\nu_2$, with a constant amplitude, given by a laser diode for example, and, secondly, a modulating electrical signal representing, for example, a sequence of binary data. The layer 1 is transparent to the control wave since its energy $h \cdot \nu_2$ is smaller than the layer 1 bandgap width $E_{ga}$.

The propagation modes in this type of guide can be divided into two groups, the TE (transverse electric) modes for which the electric field's only component which is associated with the propagation is directed along an axis oy, and the TM (transverse magnetic) modes for which the electric field has one component along an axis ox and one component along an axis oz, the axis oz being parallel to the direction in which the guided wave is propagated, the axis oy being parallel to the large side of the section of the guide and the axis ox being parallel to the small side of the section of the guide. It is shown that the only modes that will be influenced by the transition from the level $e_1$ to the level $e_2$ are those modes possessing a non-null component of the electric field in the direction perpendicular to the plane of the potential barriers of the quantum well, i.e. perpendicularly to the plane of the guide. Moreover, the most favorable case as regards modulation corresponds to the use of a guide having a single TM mode.

The modulator according to the invention can be used to achieve either an amplitude modulation or a phase modulation or again a controllable polarization. The type of modulation obtained depends on the difference between the frequency $\nu_1$ of the wave to be modulated and the frequency $\nu_1^0$.

FIGS. 5a and 5b respectively show the graph of the absorption $\Delta\alpha$ per unit of length of the guide, and the phase shift $\Delta\phi$ of this wave as a function of the frequency $\nu_1$. The first graph has a bell shape centered on the frequency $\nu_1^0$. The second graph has an S shape centered on the frequency $\nu_1^0$ and has a maximum and a minimum value with a frequency shift of a value $\Delta\nu_1$ with respect to $\nu_1^0$.

To use the modulator as an amplitude modulator with a minimum phase modulation, the frequency $\nu_2$ of the wave to be modulated should be close to $\nu_1^0$ with a difference of less than $\Delta\nu_1$. Whereas, to use the modulator as a phase modulator with a minimum amplitude modulation, the frequency $\nu_1$ should differ by at least $\Delta\nu_1$ with respect to $\nu_1^0$ to obtain a high phase shift $\Delta\phi$ while, at the same time, reducing the absorption $\Delta\alpha$ to the greatest extent possible. The hachured zone in FIG. 5b corresponds to the range of frequencies to be avoided in the latter case.

This modulator can also be used as a controllable polarizer. For, as mentioned earlier, only the TM modes can be absorbed by a transition of the electrons from the level $e_1$ to the level $e_2$ of the quantum well. Should modes of both types, TE and TM, be excited at the input of the guide, the TE modes keep their initial amplitude while the TM modes are absorbed when the quantum well is illuminated at the frequency $\nu_2$. Without this illumination, the amplitudes of the modes of both types remain unchanged. Consequently, this modulator can be used as an optical control polarizer. The overlapping between the zone of disturbance and the zones of propagation of the different modes varies with the order and nature of the latter. The most efficient embodiment of the modulator, for it to be used as a polarizer, comprises a guide with a single TE mode and a single TM mode, and the frequency of the wave to be polarized should be as close as possible to $\nu_1^0$.

The modulator according to the invention also enables making an electrically controlled polarizer by associating it with a standard modulator or an electrically controlled optical switch to stop or to transmit a frequency $\nu_2$ wave provided, for example, by a laser diode.

The consequence of the small extension of the zone where the optical properties vary according to the modulating signal is that the overlapping between the propagation zones of the optical modes and the disturbance zone is small. Consequently, the modulation efficiency is low when there is only one quantum structure as described above. To increase this overlapping, the number of quantum wells can be multiplied by stacking layers of the two types semiconducting materials alternately to create a series of quantum wells.

FIG. 6 shows a second embodiment of the modulator according to the invention, having several quantum wells. Furthermore, this embodiment has a special configuration enabling a two-dimensional confinement of the wave to be modulated. It comprises: a first layer 11, designed to provide for the two-dimensional confinement, consisting of semiconducting material of the first type $M_a$; a periodic succession of layers of material $M_b$ and material $M_a$ with respective thicknesses of $1_b$ and $1_a$, constituting a zone 12 called a multiple quantum well; a layer 13 of $M_a$ type material; and a substrate 14.

The first layer 11 has a flat rib 11b placed along the big axis of symmetry of the layer 11. This flat rib 11b projecting out of a flat part 11a. The flat part 11a is got by making a reduction $1_x$ in the thickness $1_{11}$ of the layer 11. The thickness of the rib 11a *is therefore $1_x$* and its width is marked $1_y$. The wave to be modulated, $h\cdot\nu_1$, is propagated in the direction of the big axis of symmetry of the rib 11a.

The thickness $1_a$ determines the width of the potential barriers between the wells and should be big enough to prevent the coupling of these wells, namely big enough for the state of an electron in one well to be independent of the state of the electrons in the other wells. The thickness $1_b$ is such that the wells have at least two permitted discrete levels of energy in the conduction band. The fact that there is a great number of wells has the effect not only of improving the overlapping between the disturbance sought and the guided mode, but also of increasing the number of electrons available at the level $e_1$, thus pushing back the saturation threshold of the transitions from the level $h_1$ to the level $e_1$, and from the level $e_1$ to the level $e_2$.

In this embodiment, since the confinement of the wave to be modulated is two-dimensional, the modes are no longer precisely TE and TM but almost TE and almost TM. Nonetheless, the main components of the electric field are located on the axis oy for the almost TE modes and the axis ox for the almost TM modes. In practice, therefore, only the latter modes are influenced by the transition from the level $e_1$ to the level $e_2$. Hence, this embodiment too enables the phase or amplitude modulation of a guided wave with a frequency $\nu_1$, by an illumination at the frequency $\nu_2$, applied to the width $1_y$ of the rib 11b. The width of $1_y$ and the thickness $1_x$ of this rib, with respect to the flat part 11a, are calculated by a standard method depending on the number of modes accepted for the guide. The highest modulating efficiency is obtained by using a guide having only one almost TM mode. Similarly, the thickness $1_{11}$ and $1_{13}$ of the layers 11 and 13 is determined by a standard method depending on the characteristics desired for the guide.

The above-described embodiments are highly suited to the modulation of a waveguide because the interaction between the guided wave and the disturbance is achieved along a large propagation distance. In fact, it is equal to the length of the layers since the guided wave is propagated in a direction parallel to the plane of the layers and remained confined within these layers. The case of a free wave is different because it cannot remain confined within these layers. The interaction is then limited to a propagation distance which is approximately equal to the thickness of the layer or layers of material $M_b$, which is far smaller than the length of the layers. In the above-described example, this thickness is equal to 0.0085 microns per layer of material $M_b$. To heighten the effectiveness of the interaction, the number of pairs of layers of material $M_a$ and material $M_b$ should be greatly increased. This number of pairs may be equal to 100 for example.

Figure 7:
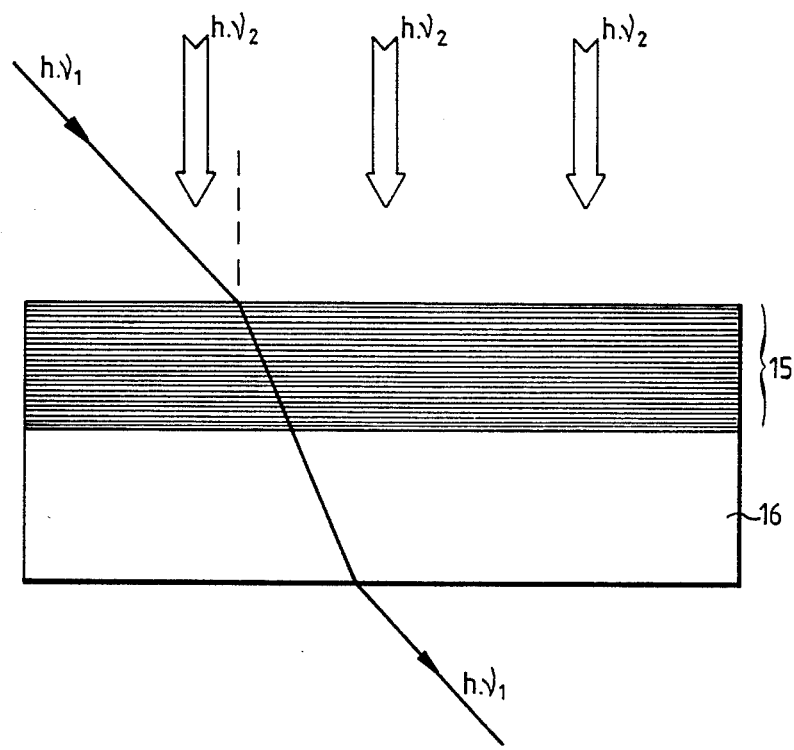
FIG. 7 shows a third exemplary embodiment of the modulator according to the invention, to modulate a freely propagated wave.

FIG. 7 shows an embodiment of the modulator, according to the invention, which is especially suited to the modulation of a non-guided wave. It comprises a multiple quantum well 15 consisting of 100 pairs of layers of material $M_a$ and material $M_b$ made, in a way similar to that of the preceding examples, on a substrate 16. The wave to be modulated, marked $h\cdot\nu_1$ is applied with any angle of incidence which, however, is non null with respect to the perpendicular to the layers 15 to obtain efficient interaction for the parallel optical polarizations parallel to the plane of incidence.

The wave to be modulated crosses the substrate 16 and comes out in a direction parallel to its direction of incidence. So as to be transparent, the substrate 16 consists of a non-doped semiconducting material of any thickness, or else a doped material with a very small thickness. The control wave, marked $h \cdot \nu_2$, is applied with zero incidence with respect to the perpendicular to the layers, in this example.

The invention is not limited to the above described embodiments. It is within the scope of those skilled in the art to choose other materials to enable the modulation of a wave with a wavelength of a different range, or to use a control wave with a wavelength of a different range.

The invention can be applied inter alia to active guided optics in the medium or far infrared wave range.

What is claimed is:

1. A modulator for electromagnetic waves to modulate a wave with a frequency $\nu_1$, called a wave to be modulated, by a signal modulating the amplitude of a second wave with a frequency $\nu_2$, called a control wave, said modulator comprising at least one first layer of semiconducting material of a first type, included between two layers of a semiconducting material of a second type, all the layers being crossed by the wave to be modulated and by the control wave; the two types of materials being such that there is a potential well in the conduction band and in the valence band of each first layer; the thickness of each first layer being such that the electrons of its conduction band possess at least two permitted, discrete energy levels, the energy difference between these two levels corresponding to a frequency close to the frequency $\nu_1$ of the wave to be modulated and said thickness of each first layer being such that the holes of its valence band possess permitted energy levels such that the energy difference between the permitted fundamental level for the holes in the valence band and the permitted fundamental level for the electrons in the conduction band has a value close to that corresponding to the frequency of the control wave.

2. A modulator according to claim 1 wherein, to modulate a wave guided by one-dimensional confinement, the layers are crossed by the wave to be modulated in a direction parallel to their plane, and wherein the total thickness of these layers is such that they enable the guiding of at least one transverse magnetic mode for the range of frequencies of the wave to be modulated, and wherein the thickness of the second layers is such that there is efficient overlapping of the mode or modes of the wave to be modulated, with a disturbance generated by the control wave in each first layer.

3. A modulator according to claim 1 wherein, to modulate a wave guided by two-dimensional confinement, the layers are crossed by the wave to be modulated in a direction parallel to their plane and wherein the total thickness of these layers is such that they provide for the guidance of at least one transverse magnetic mode for the range of frequencies $\nu_1$ of the wave to be modulated; and wherein the second layer, closest to the surface, has a non-uniform thickness, said layer comprising a reduction in thickness on either side of a rib, the big axis of which corresponds to the direction in which the wave to be modulated is propagated, the width of the rib and the reduction in thickness being chosen according to the desired propagation modes.

4. A modulator according to claim 1, to modulate a non-guided wave, comprising several layers of material of the first and second type, stacked alternately on a substrate transparent to the wave to be modulated, and wherein the light to be modulated crosses the layers with a non-null angle of incidence.

5. The use of a modulator, according to claim 1, to polarize a guided light wave with said guided light wave comprising at least one transverse electric mode and at least one magnetic transverse mode.

* * * * *